United States Patent [19]
Cline et al.

[11] Patent Number: 5,784,045
[45] Date of Patent: Jul. 21, 1998

[54] PERIMETER SLIDING WINDOWS

[75] Inventors: Troy Lee Cline, Cedar Park; Scott Harlan Isensee, Georgetown; Ricky Lee Poston, Austin, all of Tex.; Jon Harald Werner, Oceanside, Calif.

[73] Assignee: International Business Machines Corporation, Armonk, N.Y.

[21] Appl. No.: 521,857

[22] Filed: Aug. 31, 1995

[51] Int. Cl.$^6$ ..................................................... G09G 5/34
[52] U.S. Cl. ............................ 345/121; 345/118; 395/340
[58] Field of Search ................................. 345/118, 121, 345/145, 146; 395/342, 343, 352, 340, 351, 341

[56] References Cited

U.S. PATENT DOCUMENTS

| | | | |
|---|---|---|---|
| 4,761,642 | 8/1988 | Huntzinger | 340/721 |
| 4,783,648 | 11/1988 | Homma et al. | 345/120 |
| 5,062,060 | 10/1991 | Kolnick | 364/521 |
| 5,140,678 | 8/1992 | Torres | 395/159 |
| 5,227,863 | 7/1993 | Bilbrey et al. | 358/22 |
| 5,305,435 | 4/1994 | Bronson | 395/351 |
| 5,583,538 | 12/1996 | Watanabe et al. | 345/121 |

*Primary Examiner*—Richard Hjerpe
*Assistant Examiner*—Xu-Ming Wu
*Attorney, Agent, or Firm*—Diana L. Roberts; Andrew J. Dillon

[57] ABSTRACT

A method, apparatus and memory embodying detailed logic direct a computer system to automatically shift a window substantially off a display screen using a pointer and user controls (e.g., mouse). The display screen has at least one edge, but typically is rectangular in shape having four edges. The first step of the method includes moving the window on the display screen in a direction consistent with the movement of the pointer. To do so, the user positions and activates the pointer over the window using the user controls. The second step includes automatically scrolling the window substantially off the display screen such that only a portion of the window remains visible at the edge of the display screen. This step occurs when the user has activated and positioned the pointer over the window and then moved the activated pointer to one of the edges of the display screen for a predetermined amount of time (e.g., two seconds).

3 Claims, 3 Drawing Sheets

PERIMETER SLIDING WINDOWS

BACKGROUND OF THE INVENTION

1. Field of the Invention

The present invention relates to user interfaces for computer systems and, more particularly, to an improved user interface for moving windows off screen.

2. Background Information and Description of the Related Art

A user interacts with a computer system via a user interface. Conventional user interfaces use a pointer (e.g., mouse cursor) to control/manipulate windows and icons. The user controls the mouse pointer using a pointing device (e.g., mouse). A mouse typically has one or more buttons for allowing the user to point and click the mouse pointer on a display screen.

An opened window can display the contents of folders and storage media (e.g., diskettes). The user interface allows the user to move one open window outside the viewing area of the display screen so that other open windows may be viewed. For example, referring to FIG. 1, the user may position pointer 6 over window 4 while holding the first mouse button down and then dragging window 4 to the edge of the display screen, thereby moving window 4 synchronized with the movement of pointer 6. In FIG. 1, the user has attempted to move window 4 off display screen 2. However, because the user grabbed the center of the title bar of window 6 and attempted to move the pointer to the edge of the display screen, the window 4 would only move as far right as pointer 8. This is because a mouse pointer can only move to the edge of a display screen, not off the display screen. Therefore, for the user to move window 4 entirely off display screen 2, the user must reposition pointer 8 over the left edge of window 41 for example at position 91 and once again slide pointer 8 to the right of display screen 2. This process is tedious and requires several steps to complete. Moreover, users do not typically think to grab the window in position 9 because targeting a center is easier and less prone to misses.

Accordingly, it would be extremely desirable for a user interface to automatically scroll the window off a display screen without requiring the user to reposition the mouse pointer.

SUMMARY

In accordance with the present invention, a method, apparatus and memory embodying detailed logic direct a computer system to automatically shift a window substantially off a display screen using a pointer and user controls (e.g., mouse). The display screen has at least one edge, but typically is rectangular in shape having four edges. The first step of the method includes moving the window on the display screen in a direction consistent with the movement of the pointer. To do so, the user positions and activates the pointer over the window using the user controls. The second step includes automatically scrolling the window substantially off the display screen such that only a portion of the window remains visible at the edge of the display screen. This step occurs when the user has activated and positioned the pointer over the window and then moved the activated pointer to one of the edges of the display screen for a predetermined amount of time (e.g., two seconds).

DETAILED DESCRIPTION OF THE PREFERRED EMBODIMENT

Figure 2:
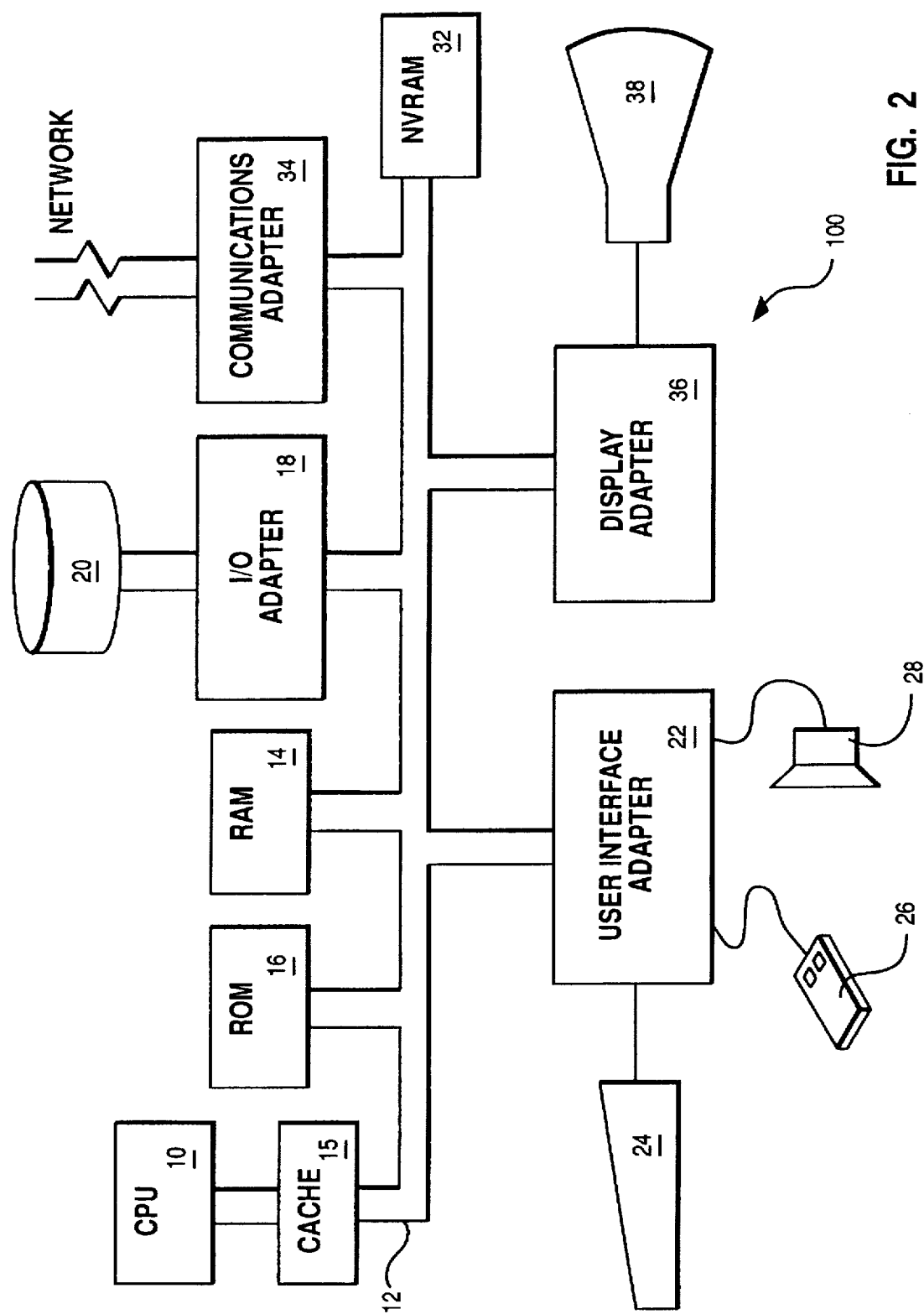
FIG. 2 illustrates a conventional workstation for use with a preferred embodiment.

The present invention is practiced in a laptop computer or, alternatively, in the computer system illustrated in FIG. 2. Computer system 100 includes central processing unit (CPU) 10, such as an IBM's™ PowerPC™ 601 or Intel's™ 486 microprocessor for processing cache 15, random access memory (RAM) 14, read only memory 16, and non-volatile RAM (NVRAM) 32. One or more disks 20, controlled by I/O adapter 18, provide long term storage. A variety of other storage media may be employed, including tapes, CD-ROM, and WORM drives. Removable storage media may also be provided to store data or computer process instructions.

Instructions and data from the desktop of any suitable operating system, such as Sun Solaris™, Microsoft's Windows NT™, IBM's OS/2™,or Apple's System 7™, control CPU 10 from RAM 14. Accordingly, the desktop executes from RAM 14. However, in the preferred embodiment, an IBM RISC System/6000™ runs the AIX™ operating system. As previously described, however, one skilled in the art readily recognizes that other hardware platforms and operating systems may be utilized to implement the present invention.

Users communicate with computer system 100 through I/O devices (i.e., user controls) controlled by user interface adapter 22. Display 38 displays information to the user, while keyboard 24, pointing device 26, and speaker 28 allow the user to direct the computer system. Communications adapter 34 controls communications between this computer system and other processing units connected to a network by network interface 40. Display adapter 36 controls communications between this computer system and display 38.

Figure 1:
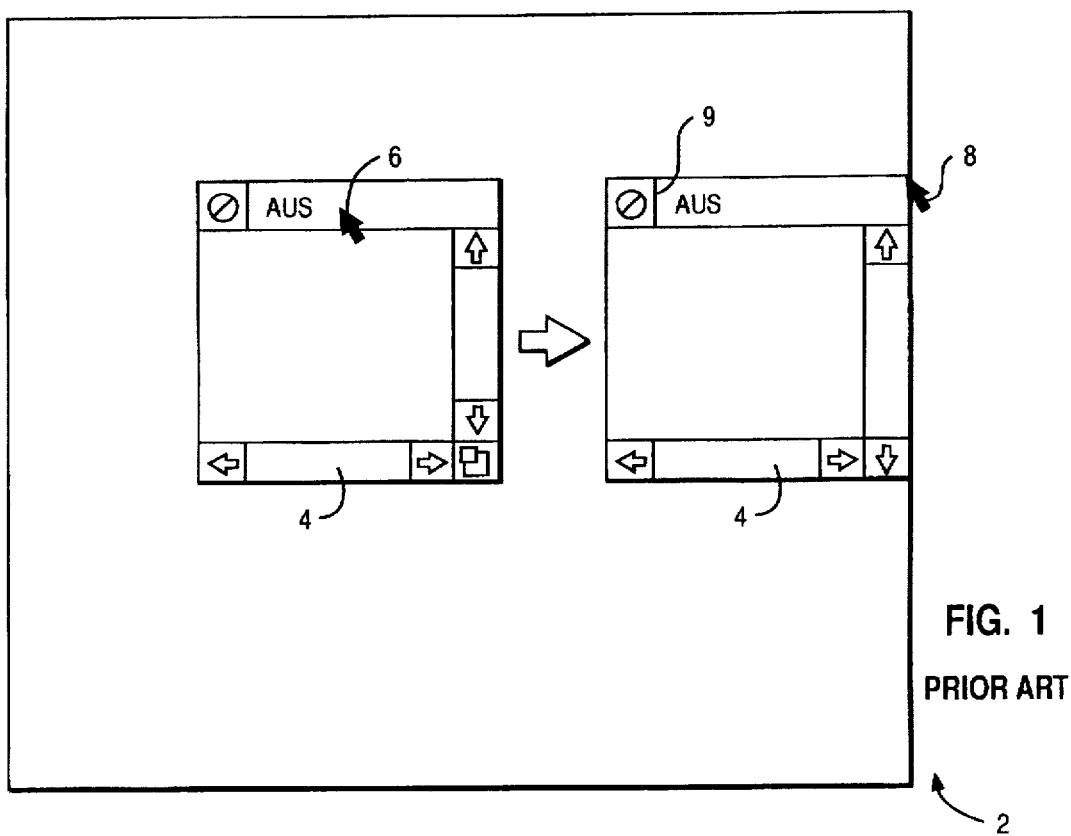
FIG. 1 illustrates a prior art display screen having a window that is being moved off the display screen.
Figure 3:
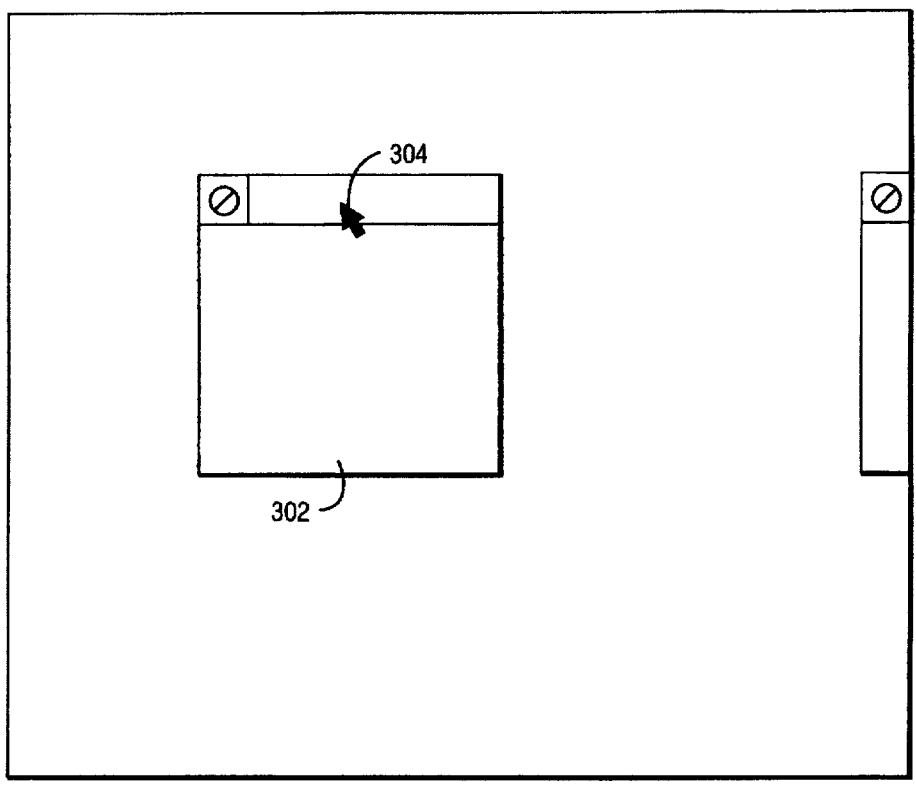
FIG. 3 illustrates a display screen having a window displayed therein that automatically scrolls off the display screen.

FIGS. 3 illustrates a display screen having a window displayed therein that automatically scrolls off the display screen. The user desires to move window 302 off display screen 300. To do so, the user positions pointer 304 over window 302 while holding down or depressing the first mouse button. The user then moves pointer 304 to the edge of display screen 300 while the user interface tracks the position/coordinates of pointer 304 on display screen 300. If the pointer is positioned at the edge of display screen 300 for a predetermined amount of time, for example, two seconds, the user interface slides window 302 to the right off display screen 300 until only a small portion of window 302 is visible on display screen 300. Just a small amount of window 302 remains displayed so that the user may drag window 302 back on display screen 300 at a later time.

If the user has not positioned the pointer at the edge of display screen 300, and has released the first mouse button, the user interface repositions the window based upon the new position of the pointer.

Figure 4:
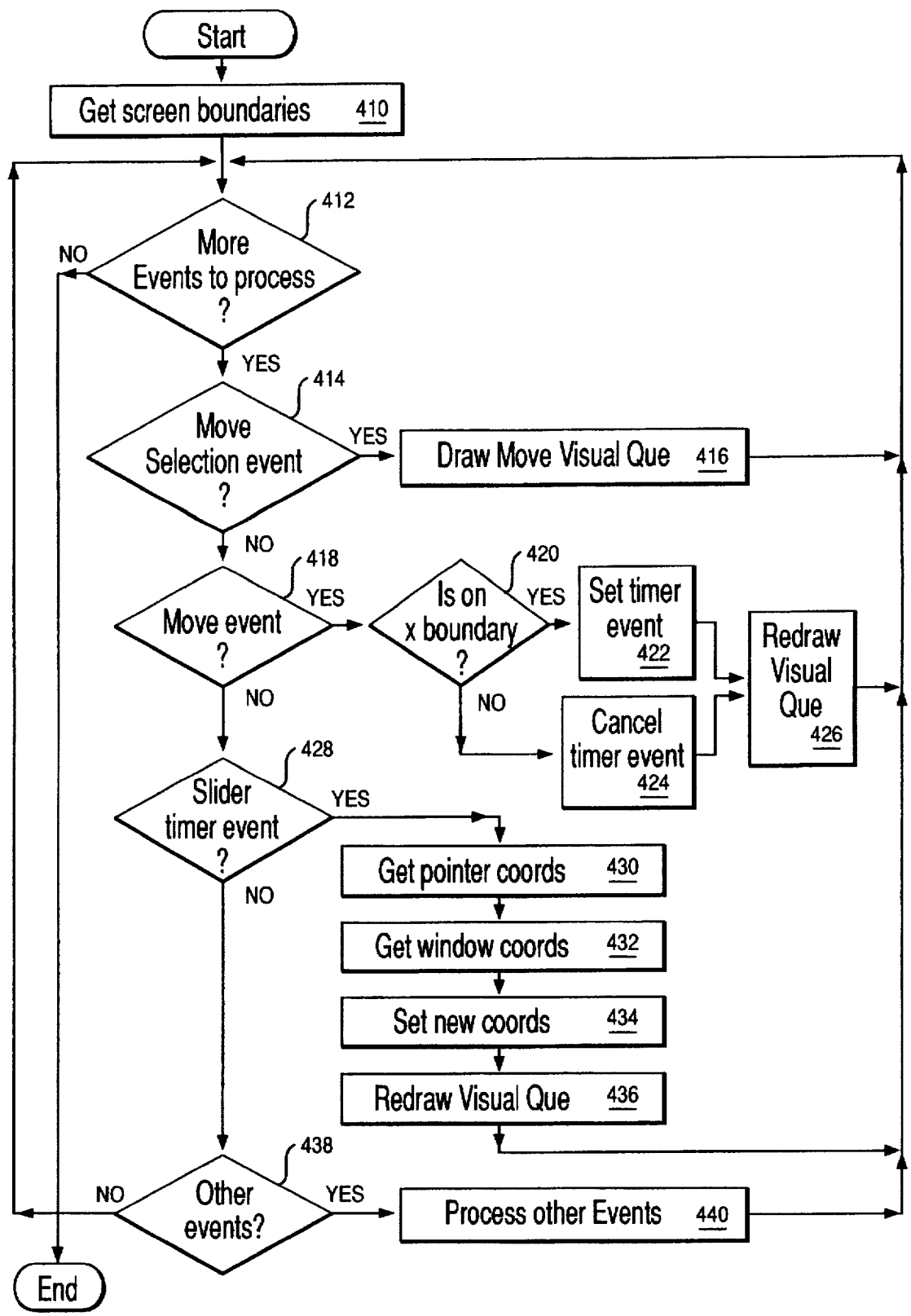
FIG. 4 illust rates a flowchart of detailed logic for implementing the preferred embodiment.

FIG. 4 illustrates a flowchart of detailed logic for implementing the preferred embodiment. At 410, the user interface retrieves the screen boundaries. At 412, the user interface determines if an event needs processing. If so, at 414, the user interface determines if the event is a move selection event. A move selection event occurs, for example, when the user positions pointer 304 over window 302 while holding down or depressing a mouse button. If a move selection event occurred, at 416, the user interface draws the move visual que of the window. That is, the user interface repositions the window in accordance with the new position of pointer 304.

At 418, the user interface determines if a move events has occurred. A move event occurs anytime the users move the mouse pointer. If a move event occurred, at 420, the user interface determines if the coordinates of the mouse pointer is on the boundary of the screen. If so, the user interface sets a timer event at 422 for a predetermined amount of time (2 seconds). If not, at 424, the user interface cancels the timer event if it has been set. At 426, the user interface redraws the visual que of the window in accordance with the coordinates of the mouse pointer.

At 428, the user interface makes a determination if a slider timer event has occurred. If so, the user interface retrieves the pointer coordinates at 430. At 432, the user interface retrieves the window coordinates. At 434, the user interface sets new coordinates of the window such that only a small portion of the window is visible. At 436, the user interface redraws the visual que of the window, thereby sliding the window substantially off the screen. At 438, the user interface makes a determination if other events need processing and, if so, they are processed at 440.

The following illustrates code for implementing the preferred embodiment:

```
---INITIALIZATION---
//
// Get horizontal resolution of display
//
screenW = get width of screen
//
// Set the number of pels to slide the window
//
slidePels = 10
//
// State variable to determine if currently in window move mode
//
windowMove = FALSE
//
// Interval time (in milliseconds) to slide the window again
//
slideTime = 250
---EVENT PROCESSING---
WHILE (more events to process)
    //
    // This event indicates that the user has selected a window to
    // move either by clicking on the window and holding the
    // button or by using the keyboard selection event. This
    // event is produced by the windowing environment.
    //
    IF (MOVE WINDOW SELECTION EVENT)
        windowMove = TRUE
        windowID = selected_window_id
        //
        // Draw move rectangle could be any method that would represent
        // movement to the user such as a tracking rectangle or a bit
        // image of the window that could be bit blit.
        //
        draw move rectangle at current window coordinates
    ENDIF
    //
    // This event would be generated from the windowing environment.
    // This could be a mouse event or a keyboard event.
    //
    IF (MOVE EVENT)
        IF (windowMove == TRUE)
            get current pointer coordinates
            IF (pointer_x_coord == 0) or (pointer_x_coord == screenW)
            //
            // Set a timer event to go off in a "sliderTime" of
            // milliseconds.
            //
            set SLIDER TIMER EVENT for sliderTime
        ELSE
            //
            // Pointer is not longer on display boundaries. Therefore
            // we can cancel any SLIDER TIMER EVENTs currently set.
            //
            cancel SLIDER TIMER EVENT
        ENDIF
        //
        // Redraw move rectangle relative to the pointer coordinates.
        //
        redraw move rectangle relative to pointer coordinates
        ENDIF
    ENDIF
    //
    // Generated from MOVE EVENT processing
    //
    IF (SLIDER TIMER EVENT)
        get current pointer coordinates
        get coordinates of windowID window
        IF (pointer_x_coord == 0)
            window_x_coord = window_x_coord - slidePels
        ENDIF
        IF (pointer_x_coord == screenW)
            window_x_coord = window_x_coord + slidePels
        ENDIF
        //
        // Redraw move rectangle to its new coordinates and thus
        // giving the appearance that the window is sliding
        //
        redraw tracking rectangle relative to new coordinates
        //
        // Set up the next timer event to slide the window even more.
        //
        set SLIDER TIMER EVENT for sliderTime
    ENDIF
    //
    // Process other events
    //
    IF (other events)
        process other events
    ENDIF
ENDWHILE
```

While the invention has been shown and described with reference to particular embodiments thereof, it will be understood by those skilled in the art that the foregoing and other changes in form and detail may be made therein without departing from the spirit and scope of the invention, which is defined only by the following claims.

We claim:

1. A computer implemented method for automatically shifting a window substantially off a display screen, the display screen having at least one edge, comprising the steps of:

in response to a pointer means being positioned and activated over the window using user controls, moving the window on the display screen in a direction consistent with movement of the pointer means; and in response to the pointer means being activated over the window and located at one of the edges of the display screen for a predetermined amount of time, automatically sliding the window substantially off the display screen such that only a portion of the window remains visible at the edge of the display screen.

2. A computer system for automatically shifting a window substantially off a display screen, the display screen having at least one edge, comprising:

in response to a pointer means being positioned and activated over the window using user controls, a processor for moving the window on the display screen in a direction consistent with movement of the pointer means; and in response to the pointer means being activated over the window and located at one of the edges of the display screen for a predetermined amount of time, a processor for automatically sliding the window substantially off the display screen such that only a portion of the window remains visible at the edge of the display screen.

3. An article of manufacture, comprising:

a computer usable medium having computer readable program code means embodied therein for automatically shifting a window substantially off a display screen, the display screen having at least one edge, comprising:

computer readable program means for causing a computer to move the window on the display screen in a direction consistent with movement of the pointer means in response to a pointer means being positioned and activated over the window using user controls; and computer readable program means for causing a computer to automatically slide the window substantially off the display screen such that only a portion of the window remains visible at the edge of the display screen in response to the pointer means being activated over the window and located at one of the edges of the display screen for a predetermined amount of time.

\* \* \* \* \*

UNITED STATES PATENT AND TRADEMARK OFFICE
CERTIFICATE OF CORRECTION

PATENT NO. : 5,784,045
DATED : July 21, 1998
INVENTOR(S) : Troy L. Cline et al.

It is certified that error appears in the above-identified patent and that said Letters Patent is hereby corrected as shown below:

In col. 2, line 6, please change "illust rates" to --illustrates--.

In col. 3, line 48, please add --move-- after "the".

In col. 6, line 3, please change "mov ement" to --movement--.

Signed and Sealed this

Twenty-sixth Day of January, 1999

Attest:

Attesting Officer

*Acting Commissioner of Patents and Trademarks*